2 Sheets--Sheet 1.
W. P. CLARK.
Apparatus for Drawing Soda, Mineral-Water, &c.
No. 155,639.  Patented Oct. 6, 1874.
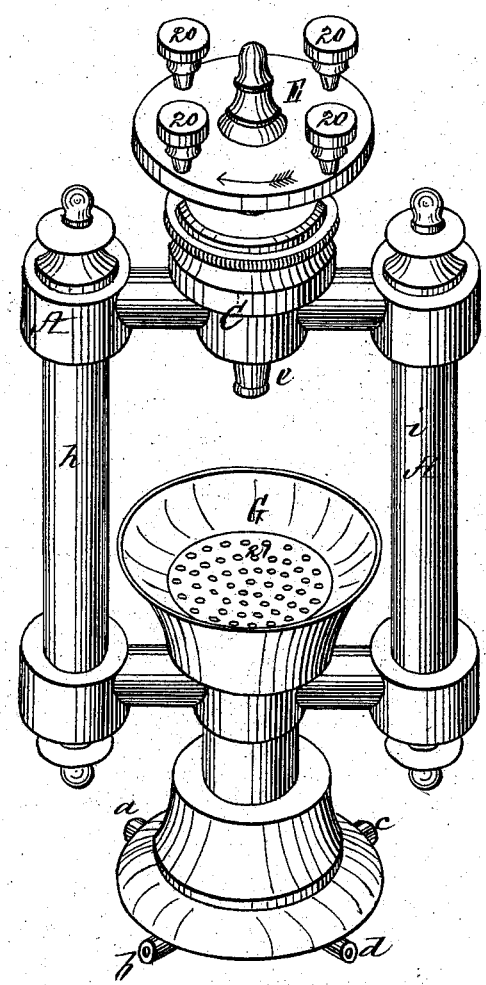
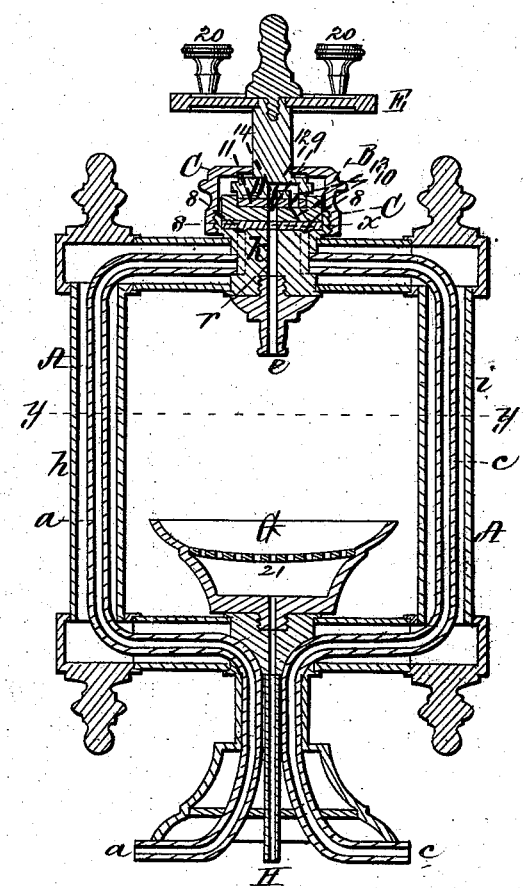
Witnesses,
W. J. Cambridge
G. N. Whittington
Inventor,
William P. Clark
Per Teschemacher & Stearns
Attorneys.

2 Sheets--Sheet 2.
W. P. CLARK.
Apparatus for Drawing Soda, Mineral-Water, &c.
No. 155,639. Patented Oct. 6, 1874.
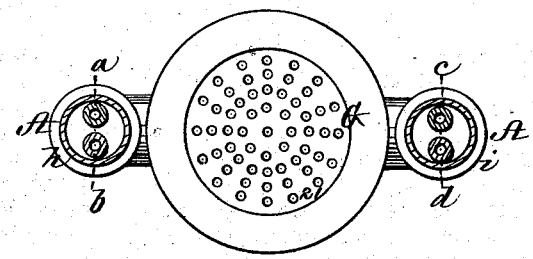
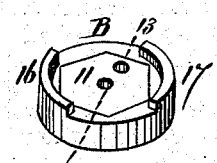
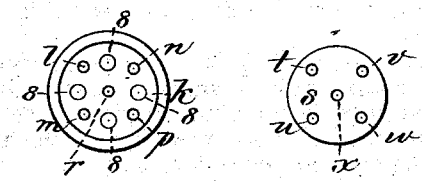
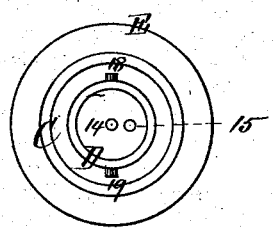
Witnesses,
N. J. Cambridge
G. N. Whittington
Inventor,
William P. Clark
Per Teschemacher & Stearns
Attorneys.

UNITED STATES PATENT OFFICE.

WILLIAM P. CLARK, OF MEDFORD, MASSACHUSETTS.

IMPROVEMENT IN APPARATUS FOR DRAWING SODA, MINERAL-WATER, &c.

Specification forming part of Letters Patent No. 155,639, dated October 6, 1874; application filed August 19, 1874.

*To all whom it may concern:*

Be it known that I, WILLIAM P. CLARK, of Medford, in the county of Middlesex and State of Massachusetts, have invented certain Improvements in Apparatus for Drawing Soda, Mineral Waters, &c., of which the following is a full, clear, and exact description, reference being had to the accompanying drawings making part of this specification, in which—

Figure 1 is a perspective view of my said improved apparatus. Fig. 2 is a vertical section through the center of the same. Fig. 3 is a horizontal section on the line $yy$ of Fig. 2. Fig. 4 is a perspective view of the valve. Fig. 5 is a plan of the valve-seat. Fig. 6 is a plan of the washer covering the valve-seat; Fig. 7, detail.

My invention consists in a series of pipes communicating with a common central discharge-passage, in combination with a revolving valve and a plug for opening and closing them, whereby various waters may be drawn by turning a single wheel instead of several wheels, as heretofore. My invention also consists in a valve-seat provided with one or more recesses, into which the washer is forced to prevent it from turning, whereby the openings therein communicating with the various pipes will always be kept in line, as required. My invention also consists in a perforated tumbler-stand, for conducting the overflow and dripping into a waste-pipe below.

To enable others skilled in the art to understand and use my invention, I will proceed to describe the manner in which I have carried it out.

In the said drawings, A is a casing, which incloses four pipes, $a\ b\ c\ d$, for conducting the various kinds of mineral waters from their respective receptacles below to a common central discharge-pipe, $e$, above. Two of these pipes, $a\ b$, pass up through the branch $h$ of the casing, and the other two pipes, $c\ d$, pass up through the branch $i$, (see Fig. 3,) all of these pipes running in a horizontal direction to a circular valve-seat, $k$, Fig. 5, in which are formed concentric openings $l\ m\ n\ p$, communicating with the pipes $a\ b\ c\ d$, and a central opening, $r$, leading into the discharge-pipe $e$. Upon this valve-seat is placed a circular washer, $s$, Fig. 6, provided with four holes, $t\ u\ v\ w$, of corresponding size with, and placed immediately in line above, the openings $l\ m\ n\ p$, the washer also being provided with a central hole, $x$, directly in line above the opening $r$ and the discharge-pipe $e$. The valve-seat is also provided with recesses 8, into which the under side of the washer is forced, so that it will be prevented from turning, and be kept in its proper position, thereby keeping open the communication with the pipes $a\ b\ c\ d$. B is a valve, (see Fig. 4,) which rests on the washer $s$, and is provided with two openings, 9 10, a central opening, 9, and another, 10, a short distance therefrom, slightly inclined to the vertical. Within the upper side of the valve is placed a hexagonal washer, 11, having openings 12 13, communicating with those 9 10. The outside of the valve-seat is provided with a screw-thread, over which turns a cap, C, through which passes the stem of a plug, D, Fig. 7, provided with two openings, 14 15, communicating with each other and with the openings 9 10 in the valve B, the distance of the opening 15 in the plug from its central opening 14 being exactly the same as that of the opening 13 in the washer 11 from its central opening 12. The upper side of the valve is provided with two projections, 16 17, against which strike pins 18 19, projecting from the outside of the plug D, and by this means the valve is turned so as to open and close communication with the several pipes $a\ b\ c\ d$. The top of the stem of the plug D is provided with a wheel, E, having four knobs, 20, rising therefrom, each knob bearing the name of one of the kinds of mineral water to be drawn, the knobs also serving as a convenient means of revolving the wheel E. When the wheel is turned in the direction of the arrow the pins 18 19 are brought against the shoulders of the projections 16 17, which causes the valve B to turn, the opening 15 in the plug D being brought around so as to be out of line with the opening 13 in the valve, in which position either knob may be brought to the front by turning the wheel E still farther in the same direction without any water being drawn. After the knob representing the desired water is brought to the front the opening 13 in the valve is in line with the opening in the valve-seat communicating with the pipe containing the desired water. The wheel is now turned one-quarter of a revolution in the opposite direction, the plug D being thereby turned around without turning the valve B until the opening 15 of the plug is brought in line with the opening 13 in the valve and the proper opening in the valve-seat, when the water is free to flow from its supply-pipe up through the outer openings in the valve-seat, valve, and plug, down through their central openings out of the discharge-pipe. G is a dish-shaped receptacle for holding the tumbler into which the water is to be drawn, this receptacle being provided with perforations 21, through which the overflow or dripping of the water is conveyed to a waste-pipe, H, beneath.

What I claim as my invention, and desire to secure by Letters Patent, is—

1. Two or more supply-pipes, $a\ b\ c\ d$, valve-seat $k$, with its outer openings $l\ m\ n\ p$, corresponding in number to that of the pipes, and a central opening, $r$, in combination with the valve B, having openings 9 10, and the plug D, with its openings 14 15, the whole constructed to operate substantially in the manner and for the purpose set forth.

2. The valve-seat $k$, provided with recesses 8, in combination with a washer, $s$, substantially as and for the purpose described.

3. The perforated tumbler-stand G, in combination with a waste-pipe, H, substantially as described, for the purpose specified.

Witness my hand this 15th day of August, A. D. 1874.

WILLIAM P. CLARK.

In presence of—
N. W. STEARNS,
W. J. CAMBRIDGE.